Sept. 13, 1966  T. R. FOUTS ETAL  3,273,158
MULTI-POLARIZED TRACKING ANTENNA
Filed July 19, 1961  3 Sheets-Sheet 1

THOMAS R. FOUTS
EDWIN G. KEIFFER
CHARLES T. WADLINGTON
INVENTORS

BY
William L. Jones
ATTORNEY

Sept. 13, 1966    T. R. FOUTS ETAL    3,273,158
MULTI-POLARIZED TRACKING ANTENNA
Filed July 19, 1961    3 Sheets-Sheet 2

THOMAS R. FOUTS
EDWIN G. KEIFFER
CHARLES T. WADLINGTON
INVENTORS

BY
William L. Jones
ATTORNEY

Sept. 13, 1966   T. R. FOUTS ETAL   3,273,158
MULTI-POLARIZED TRACKING ANTENNA
Filed July 19, 1961   3 Sheets-Sheet 3
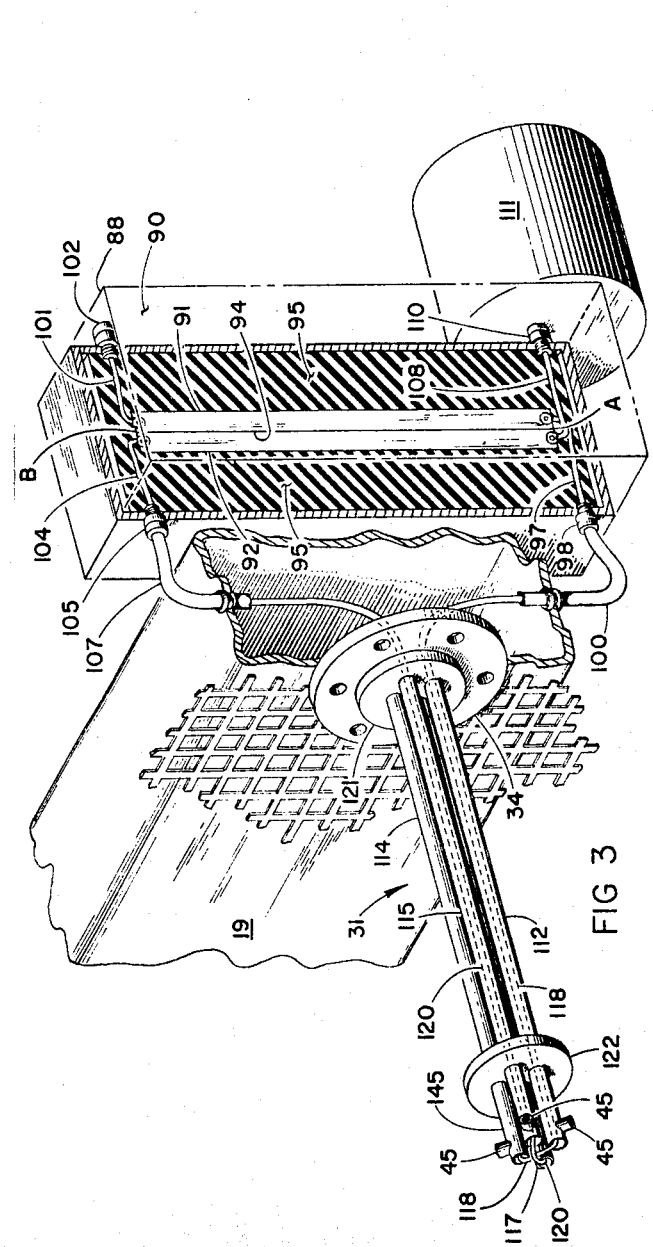
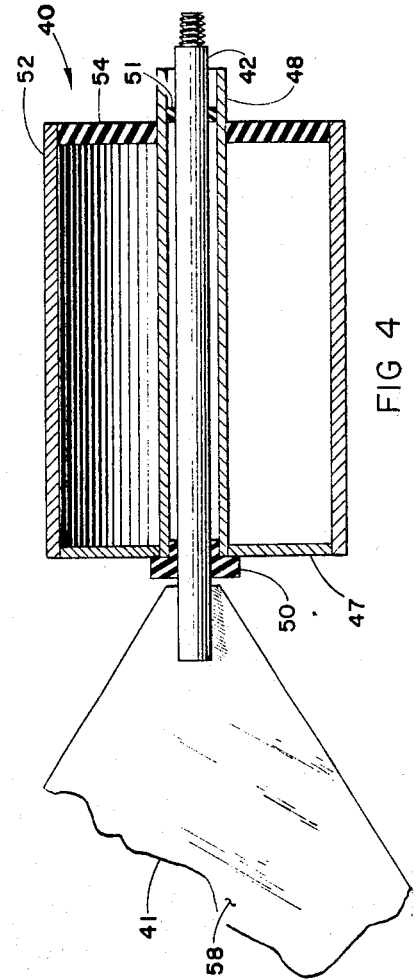
THOMAS R. FOUTS
EDWIN G. KEIFFER
CHARLES T. WADLINGTON
INVENTORS
BY
*William L. Jones*
ATTORNEY

United States Patent Office 3,273,158
Patented Sept. 13, 1966

3,273,158
MULTI-POLARIZED TRACKING ANTENNA
Thomas R. Fouts, Fort Worth, and Edwin G. Keiffer and Charles T. Wadlington, Dallas, Tex., assignors, by mesne assignments, to Ling-Temco-Vought, Inc., Dallas, Tex., a corporation of Delaware
Filed July 19, 1961, Ser. No. 125,122
10 Claims. (Cl. 343—792)

This invention relates generally to antennas and, more particularly, to antennas for use in connection with the transmission or reception of electromagnetic energy of relatively high frequency, such as in the bands commonly designated as the VHF and UHF ranges. However, the invention may also find application in connection with antennas used with energy in other frequency ranges.

One application wherein the invention provides particular advantages is in connection with antennas used in the acquisition and tracking of targets and in communications and telemetering operations, such as where signals in the frequency range extending from 215 to 260 megacycles are transmitted or received. While the invention may be applied elsewhere, it is anticipated that the antennas will ordinarily be located near ground level, such as at a ground or shipboard station used in operations wherein signals from remote stations are received. These remote stations may, for example, be located in missiles or vehicles traveling in air or space mediums above the level of the earth.

The tracking and telemetry systems used at this time are commonly required to handle communications involving signals obtained from fast-moving vehicles traveling great distances from the earth. The basic functions of such systems are ordinarily those of locating a moving target, tracking the target while it is moving, and receiving telemetry data transmitted by equipment located in the moving target or vehicle being tracked. The accomplishment of these basic functions is made more difficult by the fact that the amplitude of the signals received are relatively low, which is to be expected in view of the fact that the transmitter in the space vehicle is ordinarily of relatively low-power and light weight. Accordingly, it will be appreciated that the size and weight limitations placed on transmitting equipment carried in air and space vehicles make it very important to employ at the ground station receiving antennas and equipment having relatively high sensitivity and exceptional performance capabilities.

In designing antenna systems for installation at locations in the air or space vehicles themselves, it is usually considered that selection may be made between either circular or linear polarization. To obtain the best all-around pattern coverage, linear polarization has commonly been selected for systems installed in missiles and satellites. While the usage of a pure linear polarization in the space vehicle system with a circularly polarized antenna system at the ground location will generally provide satisfactory results, there are certain disadvantages, such as due to the power loss (commonly about 3 decibels) which occurs where a circularly polarized receiving antenna is used with a linearly polarized transmitting antenna.

Additionally, it is recognized that the generation or transmission of purely linearly polarized signals at the space location is extremely difficult, such as because of the complexity of the shape of the missile or satellite with which the antenna system must be coordinated. Thus, at some angles of the vehicle in space, the antenna system will produce both the desired polarization and other undesired polarizations, sometimes yielding at the ground station a complex mixture of linear polarization (both horizontal and vertical) with elliptical polarization (both left and right senses). Accordingly, it is recognized that there is need for the ground station to employ an antenna system capable of receiving any or all signals having various types of polarizations. Also, where this multi-polarization is possible, it is desirable for the arrangement to permit any desired polarization to be conveniently selected, such as by merely operating a switch or changing certain cable or wire connections.

While the conventional helical array has the advantage of permitting circular polarization, it is difficult to change or adjust the sense or direction of the circular polarization, ordinarily necessitating that the antenna element be changed each time it is desired to change from right to left sense or vice versa. Also, the helical array has the disadvantage of requiring that its end-fire length be relatively long to permit the obtainment of sufficient gain with the desired circularity of polarization.

A general object of the present invention is to provide an improved antenna for use in connection with the transmission or reception of electromagnetic energy.

A more specific object of the invention is to provide an improved antenna of the type described having relatively high sensitivity and relatively short end-fire length.

Another specific object of the invention is to provide an improved antenna of the type described for use with electromagnetic energy signals in a relatively broad range of frequencies, such as over the frequency range of 215 to 260 megacycles where the antenna mid-band frequency is near the middle of this range.

Another specific object of the invention is to provide an improved antenna of the type described having a relatively narrow beamwidth resulting in a relatively highly directive antenna.

Another specific object of the invention is to provide an improved antenna of the type described having provisions permitting multi-polarization.

Another specific object of the invention is to provide an improved multi-polarized antenna of the type described having provisions permitting reception or transmission of either vertical or horizontal linear polarization and either right-hand or left-hand circular polarization.

Another specific object of the invention is to provide an improved antenna of the type described which may be conveniently mounted in an array including a plurality of antennas having superior structural and functional features.

A further specific object of the invention is to provide an improved antenna array including a plurality of antennas mounted at relatively close locations with provision for considerably reducing the tendency of the antennas to interact or interfere with each other.

A further object of the invention is to provide an improved multi-polarized antenna system for use in connection with tracking and telemetry operations.

Yet another object of the invention is to provide an improved phase-shifting arrangement for use with antennas, for example, such as where it is desired to feed vertical and horizontal antennas with signals differing in phase.

A still further specific object of the invention is to provide an improved phasing arrangement for use with antennas, including provision for reducing objectionable effects due to impedance mismatches with the antennas being phased.

In accordance with one aspect of the invention, an antenna is provided which includes a full-wavelength dirven element portion and a plurality of directors or retarding elements which are electrically isolated form each other. Where the driven element portion is center-fed, at least one director or retarding element is mounted ahead of each of the half-wavelength antenna sections or dipoles, thus forming a director element portion including one or more pairs or sets of directors or retarding elements. The members of each pair or set are preferably isolated both from each other and from the other parts of the antenna.

In a preferred arrangement, the full-wavelength driven element portion includes conductive sleeve members which encircle and are spaced-apart from its intermediate or mid-length sections, such as the adjacent quarter-wavelength portions of the pair of half-wavelength antenna elements or dipoles. Thus, the overall sleeve extends for a distance of about a quarter-wavelength on either side of the center or mid-length point of the driven element portion. In one arrangement, each of the sleeve members includes a re-entrant portion having an outside diameter or cross-dimension larger than that of its inner portion which encircles the antenna driven element. Additionally, it is preferred that each of the protruding quarter-wavelength sections of the driven element have a relatively small length-to-diameter ratio. Further, it is preferred that shunting members extend from the sleeve to points near the ends of the driven element protruding therefrom.

In related aspects thereof, the invention involves the concept of a multi-polarized antenna including vertical and horizontal full wavelength dipoles, which may include the aforesaid features and are preferably mounted in a cruciform arrangement. If desired, a plurality of the multi-polarized antennas may be mounted together in an array. It is preferred that the array include a reflector element in the form of a ground plane or screen having suitably oriented ridges extending between the mounted antennas, the ridges having surfaces which are arranged to deflect electromagnetic energy arriving thereat from the adjacent antennas, whereby there is less tendency for the antennas in the array to interact or interfere with each other.

In yet another aspect, the invention involves the concept of a phasing device which may advantageously be employed, for example, in feeding the aforesaid vertical and horizontal dipoles. The phasing device includes first and second quarter-wavelength conductive electrodes or plates disposed in generally parallel and very closely spaced relation to each other so as to be reactively coupled together throughout substantially the length thereof. Suitable input and output connection means are coupled to the opposite ends of the plates. The arrangement is such that the antenna dipoles may be fed with a phase difference of near or about 90 degrees over a relatively broad range of frequencies, such as from about 215 to about 260 megacycles. A suitable dummy load or resistance is coupled to one end of one of the plates, the feed line being coupled to the opposite end of the other plate. The arrangement reduces the effect of undesired or reflected energy and the tendency toward phase shifting such as may be due to impedance differences or mismatch.

The foregoing and additional objects, advantages and novel features of the invention will be more apparent from the following description when read in conjunction with the accompanying drawing in which similar reference characters are used to designate similar parts in all views and wherein:

FIGURE 3 is an enlarged, partly cut-away view, showing an interiorly mounted portion of the assembly of FIGURE 2 and including a sectional view of the phasing device; and FIGURE 4 is an enlarged sectional view of a portion of the antenna assembly of FIGURE 2.

Figure 1:
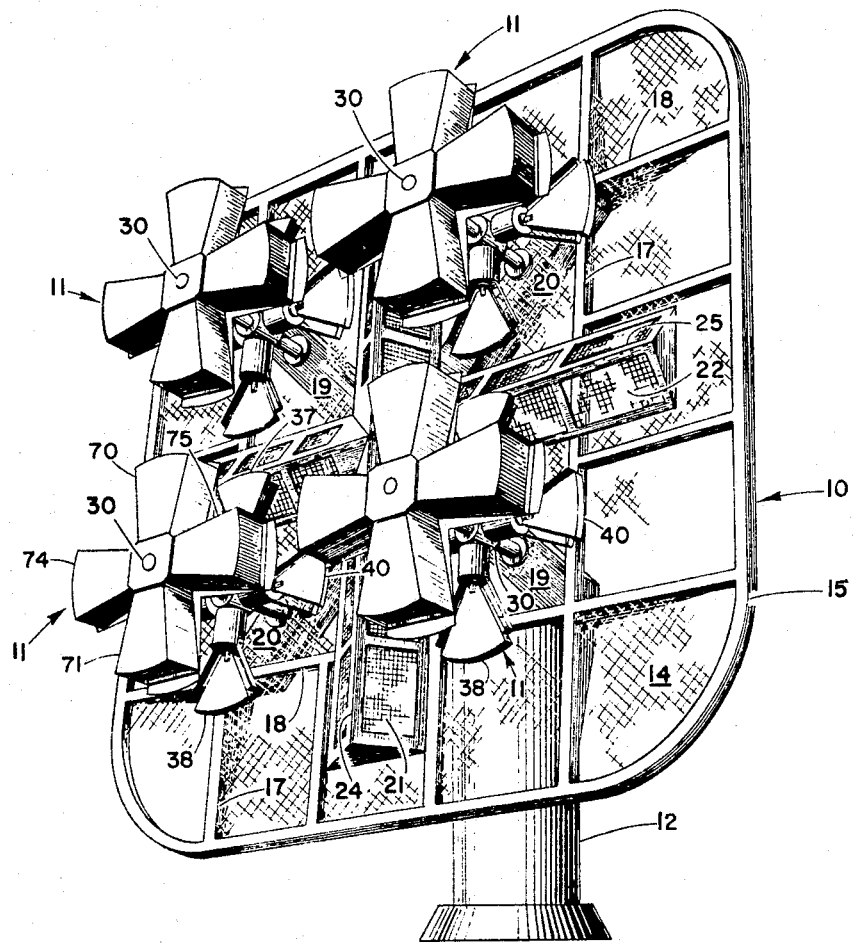
FIGURE 1 is an elevational view of an antenna array including a plurality of antenna assemblies constructed and mounted in accordance with the invention.

Referring to the drawing in detail, the invention is there illustrated and is hereinafter described, by way of example, with particular reference to its application in connection with antennas suited for use in operations involving the acquisition and tracking of targets, such as missiles or space vehicles, and in connection with other communication and telemetering operations wherein data or information from such targets is obtained. At the present time, these operations may be conducted utilizing antenna systems operating with electromagnetic energy in the 215–260 megacycle telemetry band. It is understood, however, that the invention may also be applied to equipment operating in other frequency ranges. Also, the invention may find wide application in connection with equipment used for other purposes than those mentioned, and including equipment used in the transmitting as well as in the receiving of electromagnetic or radio energy.

Referring first to the arrangement of FIGURE 1, there is shown an antenna array 10 which includes a plurality of antenna assemblies 11 constructed and mounted in accordance with one embodiment of the invention. The array 10 is shown mounted on an upstanding support or tower 12, the base or lower end of which may be located at ground level or higher, such as on a building or other structure. If desired, the antenna array 10 may be suitably mounted at a location on a movable structure, such as on a ship or truck or other vehicle.

The antenna array 10 also includes a reflector screen 14 which includes a conductive material, such as a stretched layer of wire mesh or the like. The screen 14 in effect provides a ground plane insofar as the high frequency electromagnetic energy is concerned. If desired, the screen 14 may include several pieces of material which are individually mounted. As shown, the screen 14 is generally coextensive with a supporting frame 15 the periphery of which is of generally rectangular shape, with somewhat rounded corners.

The frame 15 includes a number of vertically extending supporting members 17 and a number of horizontally extending supporting members 18. The members 17 and 18 have their ends secured to the peripheral portion of the frame 15 and are themselves supported by cross-members 19 and 20, which in turn are suitably mounted on the tower 12. It will be noted that the cross-members 19 and 20 are arranged to form an X-shaped structure on each arm of which is mounted one of the four antenna assemblies 11.

The arrangement is such that the two lower antenna assemblies 11 are mounted below the horizontal centerline of the reflector screen 14 and are approximately equally spaced from and to each side of its vertical centerline. The two upper antenna assemblies 11 are similarly spaced to each side of the vertical centerline and are located above the horizontal centerline in symmetrical relation to the two lower assemblies 11. The vertical and horizontal apertures, that is, the spacings between the centerlines of the several antenna assemblies 11, are approximately one wavelength at the lower end of the frequency band over which the array 10 is to be operated.

In accordance with one aspect of the present invention, the reflector screen 14 is provided with a vertically extending raised portion 21 and a horizontally extending raised portion 22, which portions 21 and 22 have rectilinear peaks 24 and 25, respectively, extending generally along the aforesaid vertical and horizontal centerlines of the screen 14. The arrangement is such that each of the raised portions 21 and 22 is generally V-shaped in cross-section, having substantially straight side surfaces which extend in diverging relation from their respective peaks 24 and 25 to their points of intersection and junction with the flat or unraised portion of the screen 14. Thus, the vertical raised portion 21 is crossed at the center of the reflector screen 14 by the similar but horizontal raised portion 22, with the result that the screen 14 is divided into four sections. Each of the four antenna assemblies 11 is mounted centrally of one of these four sections and is shielded or protected by the raised portions 21 and 22 from objectionable interaction or interference due to its proximity to the other antenna assemblies 11. This shielding or protection is accomplished due to the diverging side surfaces being arranged, as aforesaid, so that energy in the radiation or reception pattern of any one of the antenna assemblies 11 which strikes such surfaces is reflected in directions away from each other of the other antenna assemblies 11.

Figure 2:
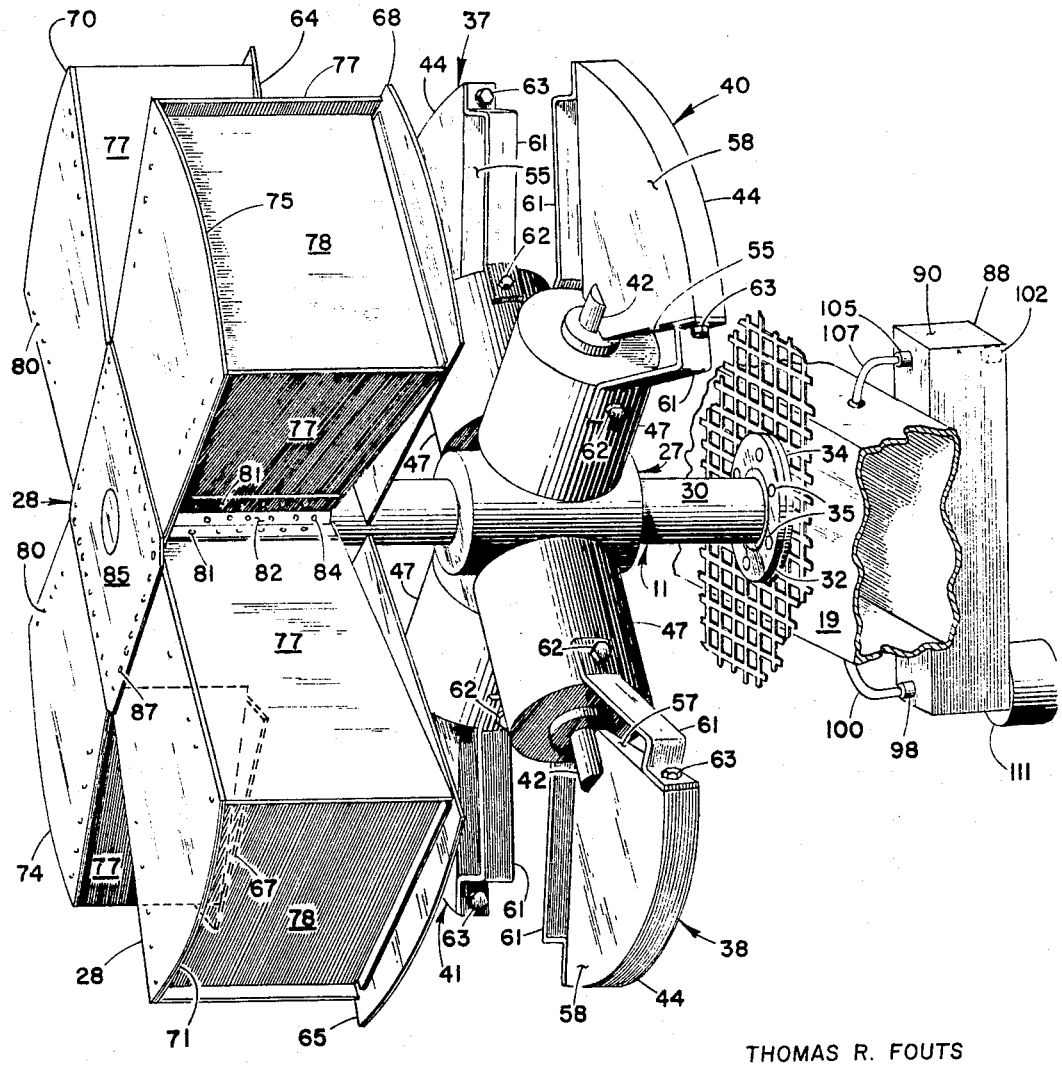
FIGURE 2 is mainly an enlarged elevational view of one of the antenna assemblies of FIGURE 1, showing the construction in somewhat greater detail, and also showing a phasing device in accordance with the invention connected for use with the antenna assembly.

Referring now to FIGURE 2, each of the antenna assemblies 11 is shown as generally including a driven element portion 27 and a director element portion 28 mounted on a hollow mast 30 which is secured at one end to and extends outwardly from one of the aforesaid cross-members, such as the cross-member 19, included in the antenna array 10 of FIGURE 1.

The antenna assembly 11 also includes a coupling portion 31 (see FIGURE 3) which to a large extent is mounted interiorly of the mast 30 and, as will appear more fully hereinafter, provides means for feeding or supplying electromagnetic energy between the driven element portion 27 and related equipment, such as a transmission line connected to a receiver or other radio device (not shown).

As shown best in FIGURES 2 and 3 together, the mast 30 and the coupling portion 31 include, respectively, circular mounting flanges 32 and 34 which permit an end portion of each to be suitably secured to the cross-member 20, such by means of fastening bolts 35 shown extending through openings suitably provided therefor.

As shown best in FIGURES 1 and 2 together, the driven element portion 27 is mounted on the mast 30 at a location intermediate the ends thereof and is preferably spaced from the reflector screen 14 a distance equal to approximately a quarter-wavelength at the mid-band frequency of operation. The director element portion 28 is mounted on the mast 30 near the free end thereof and is suitably spaced from the driven element portion 27. For example, the director element portion 28 may be mounted so that the closest conductive portion thereof is spaced less than a quarter-wavelength (at the mid-band frequency) from the driven element portion 27.

An important feature of the invention resides in the construction and arrangement whereby the driven element portion 27 includes at least one pair of antenna elements or dipoles, each of which is a half-wavelength (at mid-band frequency), with energy feeding connections provided in between the dipoles, and with the inclusion of a conductive element which extends about and for a suitable distance along the dipoles, resulting in a substantial reduction in the antenna impedance without objectionably reducing the increased gain obtained by using a pair of dipoles having an overall length equal to a full-wavelength.

In the arrangement of FIGURE 1, the driven element portion 27 includes a pair of vertically extending dipoles 37 and 38 and a pair of horizontally extending dipoles 40 and 41, there being a cruciform arrangement with spacing of about 90 degrees between the axes of adjacent ones of the arms or dipoles 37, 38, 40 and 41.

It is understood that the members of FIGURE 1 may in other or alternative arrangements be differently positioned. As one example, the dipoles 37, 38 and 40, 41 may in certain applications extend in planes shifted 45 degrees with respect to the vertical and horizontal centerlines shown in FIGURE 1.

As shown best in FIGURES 2 and 4 together, each of the antenna dipoles, such as the dipole 40, includes a radially extending rod 42 which at its outer end is connected to the narrow end of a conical or fan-like horn 44. Each of the antenna rods 42 has its inner end threadedly or otherwise coupled to one of four connectors 45 (see FIGURE 3) included in the coupling portion 31 which, as will appear more fully hereinafter, feeds or receives electromagnetic energy to or from the inner end portions of the antenna rods 42, depending on whether the antenna is transmitting or receiving.

As shown best in FIGURE 4, each of the antenna rods 42 is encircled by a conductive sleeve 47 which is connected at one end to the mast 30 and extends along such rod 42 for a distance which is preferably about a quarter-wavelength (at mid-band frequency). Thus, the portion of each dipole, such as the dipole 40, which extends radially beyond the outer end of the sleeve 47 is also preferably about a quarter-wavelength. However, it is preferred that the sleeve 47 be a conductive element which is itself an electrical half-wavelength (at mid-band frequency).

Accordingly, the sleeve 47 is shown as including an inner portion 48 of approximately a quarter-wavelength which is disposed in generally concentric relation to the antenna rod 42 and is spaced apart therefrom, such as by means of non-conductive bushings 50 and 51. The outer end portion of the sleeve 47 is bent, folded or otherwise formed so as to provide a re-entrant portion 52 which is generally concentric with and has an outside diameter somewhat larger than its inner portion 48. If desired, a non-conductive annular support or bushing 54 may be suitably disposed, as shown, between the free end of the sleeve 47 and its inner portion 48 so as to close off the annular space between the concentric portions 48 and 52.

As a result of the aforesaid construction and arrangement of the sleeve 47, there is greater isolation and less likelihood of current flow being objectionably coupled to other parts of the antenna assembly 11, such as to the supporting mast 30 where it would appear as undesirable polarization. The reduction in undesirable current flow results, for example, because the current on the inner portion 48 is in phase opposition with the current on the re-entrant or outer portion 52.

The main purpose of the conductive sleeves 47 is to lower the effective impedance of the antenna. That is, the sleeves 47 provide an arrangement which permits a pair of half-wavelength dipole elements to be fed at a considerably lower impedance point than is ordinarily possible where a full-wavelength antenna element is center-fed.

While applicants do not want to be limited to any particular theory of behavior, it is believed that the arrangement whereby one of the conductive sleeves 47 encircles each of the middle quarter-wavelength portions of the pair of half-wavelength dipoles functions to at least some extent as a coaxial transmission line leading to lower impedance feed points, such as might be expected in feeding a pair of quarter-wavelength dipoles located at the outer ends of the radially extending sleeves 47. At the same time, the overall length of the driven element portion 27 is a full-wavelength and thus the pair of half-wavelength dipole elements function as a full-wavelength antenna, with resulting higher gain than where a pair of quarter-wavelength dipole elements are employed.

While the use of the conductive sleeves 47 results in considerably lowering the effective impedance of the antenna, as aforesaid, still further reduction is obtained by virtue of the protruding portion of each of the dipoles 37, 38, 40 and 41 being formed or constructed with a relatively small length-to-diameter ratio. This is accomplished, as shown best in FIGURE 2, by using the conical or fan-like horns 44 which are secured to the outer ends of the rods 42 and are suitably oriented so that their narrower and diverging side walls 55 and 57 are extensions, respectively, of the top and bottom surfaces or edges of the antenna rods 42, while their flat fan-like front and back walls 58 extend vertically and thereby increase the effective diameter of the dipole elements in this direction.

In order to improve or reduce even further the effective impedance of the antenna, it is preferred that shunting reactances be included, such as by connecting shunt straps 61 between each of the dipole elements and a ground point.

As illustrated, each of the shunt straps 61 has one end thereof suitably connected, such as by means of bolts 62, to the outer end portion of one of the sleeves 47 which, as previously indicated, are connected at their inner ends to the mast 30. The strap 61 extends radially outward in generally parallel, spaced relation to one of the top or bottom walls 55 and 57 of the horn 44 mounted therewith in the same arm of the driven element portion 27. The outer end portion of the strap 61 is bent or folded to permit connection thereof to the horn 44, such as by means of rivets or bolts 63 shown extending through openings suitably provided therefor in the straps 61 and the horn walls 55 and 57.

Each of the shunt straps 61 is preferably equal in length to a quarter-wavelength at the mid-band frequency of operation and, thus, does not appreciably affect the impedance at this frequency. However, at lower frequencies where the wavelength is longer, the shunting straps 61 are shorter than a quarter-wavelength and thus provide inductive reactances. On the other hand, at higher frequencies where the wavelength is shorter, the shunting straps 61 provide capacitive reactances. In both situations, the total inductive or capacitive reactance is proportional to the amount of deviation from the mid-band frequency and is of suitable polarity or sign so as to tend to cancel the increase in antenna impedance which tends to occur where there is a shift in either direction from the mid-band frequency on which the design of the antenna is based.

It will also be noted that because of the usage of the shunting straps 61, as aforesaid, the outer end portion of each of the dipoles 37, 38, 40 and 41 is effectively placed at ground or zero potential insofar as D.C. or low frequency energy is concerned. This arrangement provides some protection against lightning. Also, the usage of the straps 61 improves the sturdiness of the construction.

Another important feature of the invention resides in the construction and arrangement whereby the driven element portion 27 includes at least one antenna radiator or receptor having an overall length equal to approximately a full-wavelength, as aforesaid, and whereby the director element portion 28 includes at least one pair of directors, with each director of the pair being electrically isolated from the other and also from the antenna driven element associated therewith.

The first set of directors includes a pair of vertically extending retarding elements 64 and 65 and a pair of horizontally extending retarding elements 67 and 68. Each of these elements is made of a conductive material, such as light-weight metal or the like, and is preferably of suitable size and shape and suitably spaced from its associated driven element or dipole to assist in improving the directivity and gain of the antenna. For example, the overall length of each pair of the retarding elements 64, 65 or 67, 68 may advantageously be equal to approximately a full-wavelength (at mid-band frequency) and the spacing between it and its associated pair of dipoles 37, 38 or 40, 41 may advantageously be less than a quarter-wavelength. It is understood, however, that the construction and arrangement of these parts for best results in a given application will oftentimes be determined by empirical methods, particularly since there is considerable interrelationship between certain of the factors involved in obtaining maximum performance.

The second set of directors may be of generally similar construction and arrangement as the first set. In the arrangement shown, the second set includes a pair of vertically extending retarding elements 70 and 71 and a pair of horizontally extending retarding elements 74 and 75, with the overall length of each of these pairs being a little less than that of each of the pairs 64, 65 and 67, 68 of the first set of directors. As previously indicated, the spacing between the first and second sets of directors will need to be considered in relation to other factors, where best results are concerned. However, it is believed that the spacing will ordinarily be no more than a quarter-wavelength (at mid-band frequency).

In addition to the first and second sets of directors, the director element portion 28 includes a number of radially extending walls 77 which are made of an electrically insulating or relatively non-conductive or dielectric material, such as fiber glass, and are suitably arranged in angularly spaced relation to each other so as to provide two such walls 77 extending along and in spaced-apart relation between the metallic retarding elements constituting each arm of such portion 28. If desired, the walls 77 of each such arm may be joined at their outer ends, as shown, by a transverse wall 78 which is also made of a dielectric material. The walls 77 and 78 are suitably secured to their associated retarding elements, such as to elements 64 and 70, of the first and second sets of directors, these connections being made by rivets or bolts 80, for example. At its inner end, each of the walls 77 is joined, such as by means of rivets or bolts 81, to one leg of an angle bracket 82 which has its other leg similarly joined to a wall 77 of the adjacent arm. The brackets 82 support the director element portion 28 on the mast 30, being suitably secured thereto, such as by means of bolts 84 shown extending through openings suitably provided therefor in the mast 30 and in the angle portions of the brackets 82. The arrangement is such that each bolt 84 extends through aligned openings in brackets 82 located on opposite sides of the mast 30.

As previously indicated, the retarding elements of the first and second sets of directors are each electrically isolated, both from each other and from the antenna or other active elements in the driven element portion 27. To this end, the brackets 82, which may be made of metal or the like, are shown of suitably shorter vertical length than is the spacing between the first and second sets of directors. Additionally, each of the retarding elements terminates at its inner end prior to contacting the metal mast 30 or any of the other conductive elements or parts which might objectionably couple it to another retarding element.

Accordingly, it will be noted that a "boresight" space is thus provided in the vicinity of the mast 30, which space extends generally axially of the director element portion 28 and between the inner ends of the retarding elements included in each of the first and second sets of directors. If desired, a plate 85 made of dielectric material, such as fiber glass, may be mounted across the "boresight" space, as shown, one of the plates 85 being suitably secured to the inner end portions of each set of retarding elements, such as by means of rivets or bolts 87.

With this "boresight" space provided, as aforesaid, it will be noted that the retarding elements included in each arm of the director element portion 28 in effect constitute a separate end-fire array disposed ahead of the half-wavelength dipole element included in the corresponding arm of the driven element portion 27. Thus, the director element portion 28 in effect provides four such end-fire arrays for each of the antenna assemblies 11. Accordingly, in the antenna array 10 which includes four antenna assemblies 11, a total of sixteen such end-fire arrays are included.

While applicants do not want to be limited to any particular theory of behavior, it is believed that construction and arrangement of the retarding elements, as aforesaid, results in a narrower beam width of the radiated or received energy with a resulting increase in directivity and gain. While there is also some increase in antenna impedance, various of the features hereinbefore described function to reduce the impedance and thus permit very satisfactory overall performance to be obtained.

In experiments which were conducted using an arrangement similar to that shown in FIGURE 2, it was found that the retardation of the outgoing waves from the dipole elements, together with the effect of the broadside array containing two end-fire arrays, resulted in a reduction in the E-plane beamwidth from about 47 degrees to about 25 degrees and in the H-plane beamwidth from about 110 degrees to about 43 degrees, in comparison with results obtained using an otherwise similar arrangement wherein the directors were not electrically isolated from each other so as to provide the aforesaid "boresight" space.

Another important feature of the invention resides in the construction and arrangement of a phasing device 88 which at times may be included with or connected to the coupling portion 31 of the antenna assembly 11. The phasing device 88 is ordinarily employed where circular polarization is desired and, as shown best in FIGURES 2 and 3 together, may be mounted or connected at a location behind one of the cross-members, such as the cross-member 19, included in the antenna array 10 of FIGURE 1.

As shown best in FIGURE 3, the phasing device 88 includes an elongated case 90 made of metal or the like in which are mounted conductive bars or plates 91 and 92 each of which is preferably a quarter-wavelength (at mid-band frequency). The plates 91 and 92 are spaced very close together, such as a distance of only about 0.016 inch, and are disposed on opposite sides of a suitably thin dielectric material in the form of an insulating or relatively non-conductive layer 94 shown sandwiched between the plates 91 and 92.

In order to support the plates 91 and 92 in generally parallel, closely spaced relation to each other in the case 90, as aforesaid, suitable dielectric or non-conductive material 95 may be used to fill the unused space, as shown.

The plate 91 is suitably connected at one end thereof to a wire 97 which leads to a connector fitting 98 shown coupled to an electrical cable 100 included, as will appear more fully presently, in the coupling portion 31. At its other or opposite end, the plate 91 is connected to a wire 101 which leads to a connector fitting 102 adapted to be coupled to a transmission line or cable (not shown) extending to other equipment, such as to a radio receiver (also not shown).

For convenience, the point which corresponds to the intersection of the dielectric layer 94 with the plane extending from the end of the plate 91 to which the wire 97 is connected to the corresponding end of the other plate 92 is designated point "A," while the similar point at the other end of the plates 91 and 92 is designated point "B."

The plate 92 is suitably connected at the end thereof which is opposite point "B" to a wire 104 which leads to a connector fitting 105 shown coupled to an electrical cable 107 included, as will appear more fully presently, in the coupling portion 31 of the antenna assembly 11. At its other end, which is disposed opposite point "A," the plate 92 is connected to a wire 108 which leads to a connector fitting 110 shown coupled to a dummy load 111. The load 111 may include a pure resistance and is preferably selected to match the impedance of the transmission lines connected to the other fittings provided on the case 90.

As previously indicated, each of the vertical dipoles 37, 38 and the horizontal dipoles 40, 41 has its antenna rod 42 suitably coupled to one of four connectors 45 included in the coupling portion 31 of the antenna assembly 11.

In addition to the connectors 45 and the aforesaid electrical cables 100 and 107, the coupling portion 31 includes a balun arrangement which may be of standard or conventional design and which, as shown, includes four hollow conductor rods or tubings 112, 114, 115 and 117 disposed in generally parallel, spaced relation to each other. It will be noted that the cables 100 and 107 extend through tubings 112 and 115, respectively, and have their inner conductors 118 and 120, respectively, shown extending into the other tubings 114 and 117, respectively.

The several tubings 112, 114, 115 and 117 extend through openings suitably provided therefor in spaced-apart annular supports 121 and 122 which are adapted to closely but slidably fit within the hollow mast 30, thus providing lateral support and tending to hold the tubings in their respective positions. The tubings 112, 114, 115, and 117 are electrically interconnected at one end, such as by being each connected to the support 121, which may be made of metal or the like. As shown, this support is the central portion about which extends the circular flange 34 used, as hereinbefore described, to mount the coupling portion 31 in the hollow mast 30. The other support 122 is made of a non-conductive or dielectric material.

The inner conductors 118 and 120 of the cables 100 and 107 make electrical connection with the tubings 114 and 117, respectively, at points which are preferably spaced electrically a quarter-wavelength from the common or ground connection provided, for example, at the metal support 121.

The outer conductors or shields of the cables 100 and 107 are electrically connected to the common ground point, such as by suitable soldering connections, and are thus spaced electrically a quarter-wavelength from the aforesaid connectors 45 provided near the free ends of the various tubings 112, 114, 115 and 117.

Accordingly, each of the antenna dipoles 37, 38 and 40, 41 is coupled to one of the connectors 45 at a feed-point which is preferably a quarter-wavelength from the common or ground connection. This results in a balanced feeding arrangement.

Where the antenna assembly 11 is being operated as a transmitting system, the main purpose of the phasing device 88, where included, is to permit the vertical dipoles 37, 38 and horizontal dipoles 40, 41 to be fed at near or about 90 degrees out-of-phase, such as is desired where circular polarization is to be obtained.

Where the antenna assembly 11 is being operated as a receiving system, the main purpose of the phasing device 88, where included, is to permit the vector sum of the energy signals appearing at vertical dipoles 37, 38 and horizontal dipoles 40, 41 to be supplied to related equipment coupled to the phasing device 88.

In order to more fully explain the operation of the phasing device 88, it will be assumed that the antenna assembly 11 is being operated as a transmitting system, there being a transmitter (not shown) coupled to the connector fitting 102 opposite point "B" in the phasing device 88.

Since the length of each of the plates 91 and 92 is a quarter-wavelength (assuming operation at mid-band frequency), a phase lag of about 90 degrees is introduced in the energy which is required to travel therealong between points "A" and "B." Thus, a phase lag of about 90 degrees is introduced in the energy signal from the transmitter which is supplied to the vertical dipoles 37 and 38 coupled to connector fitting 98 opposite point "A."

Due to the closeness of the spacing between the plates 91 and 92, as previously noted, the energy on each one thereof is reactance-coupled to the other, such as by capacitive coupling. While applicants are not to be considered limited to any particular theory of behavior, it is believed that the phase-shifts tending to occur due to the reactance-coupling itself are largely self-cancelling, so that no objectionably large additional phase shifts are introduced due to this arrangement.

Accordingly, while a phase lag of about 90 degrees is introduced in the energy signal supplied to the vertical dipoles 37 and 38, as aforesaid, there is no corresponding phase lag introduced in the energy signal supplied to the horizontal dipoles 40 and 41. Thus, the antennas are fed with a phase difference of about 90 degrees, with a resulting pattern of polarization which is nearly circular.

Since it is common to have some impedance mismatch in an antenna feeding system, such as because of the difficulty of constructing antennas having exactly the desired value of impedance, some of the energy reaching the antennas coupled to the phasing device 88 is likely to be reflected, so that undesired or reflected energy signals may reach the points "A" and "B." One of the main advantages arising from usage of the phasing device 88 is the reduction or prevention of objectionable effects such as accompany energy reflections due to these impedance mismatches.

In this connection, it will be noted that an impedance mismatch involving the vertical dipoles 37 and 38 causes energy reflections which travel along the plate 91 from point "A" toward point "B,'" while a similar mismatch involving the horizontal dipoles 40 and 41 causes energy reflections which travel in the reverse direction along the plate 92.

Since the energy supplied to the dipoles 37 and 38 is about 90 degrees out-of-phase with respect to that supplied to the horizontal dipoles 40 and 41, the energy reflections involving these respective antennas are likewise about 90 degrees out-of-phase upon returning to the phasing device 88. Thus, the reflected energy reaching the end of plate 91 opposite point "A" is lagging by about 90 degrees the reflected energy reaching the end of plate 92 opposite point "B." An additional phase lag of about 90 degrees is introduced in the reflected energy signal from the vertical dipoles 37, 38 as it travels along the plate 91 toward point "B."

Thus, upon the reflected energy signal from the vertical dipoles 37 and 38 reaching the end of plate 91 opposite point "B," it is about 180 degrees out-of-phase with respect to the reflected energy signal from the horizontal dipoles 40 and 41 reaching the same point "B." Accordingly, there is signal cancellation which occurs at point "B" between the reflected energy signals. Assuming that the signals are exactly equal and opposite, the cancellation will be complete and none of the reflected energy will reach the transmitter coupled to the connector 102 opposite point "B."

At the same time, it will be noted that a phase lag of about 90 degrees is also introduced in the reflected energy signal from the horizontal dipoles 40, 41 as it travels along the plate 92 toward point "A." Accordingly, the phase relationship between the reflected energy signals reaching the dummy load 111 coupled to connector 108 opposite point "A" is such that these signals do not cancel but, rather, each has a phase lag of about 90 degrees. Thus, the reflected energy signals at point "A" tend to combine, causing a voltage difference to exist across the dummy load 111, which results in current flow through the load 111 to the extent necessary to dissipate the energy.

Where the antenna assembly 11 is being operated as a receiving system for circularly polarized signals, the received energy signals travel through the phasing device 88 in directions which are opposite to those involved in a transmitting operation. Thus, using the arrangement shown, a phase lag of about 90 degrees is introduced in the signals received by the vertical dipoles 37 and 38, while no corresponding delay is introduced by the device 88 in the signals received by the horizontal dipoles 40 and 41. The combined signals supplied to the receiver equipment, such as through a transmission line connected to connector fitting 102, represent the vector sum of the signals received at the respective dipoles 37, 38 and 40, 41.

Considering now the reflected energy signals, it will be noted that the signal reflected from the receiver, which in the arrangement shown would be coupled opposite point "B," will have a phase lag of about 90 degrees introduced therein upon traveling along the plate 91 to point "A." This reflected signal is supplied to the vertical dipoles 37 and 38 where it may be dissipated by radiation. Similarly, the reflected energy signal coupled to the horizontal dipoles 40 and 41 opposite point "B" may be dissipated by radiation. It will be noted that these radiated signals, due to the arrangement of the phasing device 88, as aforesaid, are out-of-phase by about 90 degrees with respect to each other and do not materially distort or interfere with the desired circular polarization pattern.

The operation of the several antenna assemblies 11 included in the antenna array 10 of FIGURE 1 will now be described with particular reference to their application in connection with operations involving space-vehicle and missile tracking and telemetry. In these operations, the array 10 may be employed as a receiving antenna system, with the transmitting system being located in the space-vehicle or missile. It is understood, however, that the antenna array 10 in certain instances may also be employed as a transmitting antenna system, the invention not being limited in this respect.

As hereinbefore indicated, it is ordinarily desirable for several types of polarization patterns to be available for usage in connection with the acquisition and tracking of targets, such as a space-vehicle or missile, and in communication and telemetering operations where signals transmitted from such targets are to be received at a ground station, such as by the antenna assemblies 11 included in the array 10. These types of polarization include (1) right-hand or clockwise circular polarization, (2) left-hand or counter-clockwise circular polarization, (3) horizontal polarization, and (4) vertical polarization.

Where the type of operation involved is the acquisition and tracking of a target, it will ordinarily be desired for each of the antenna assemblies 11 to be coupled to a separate transmission line leading to other equipment, such as to a comparator (not shown). Where the type of operation involved is communications and telemetry, it will ordinarily be desired for the various antenna assemblies 11 to be coupled together to a common transmission line leading to other equipment, such as to a receiver (not shown).

Where circular polarization is desired, in either of the above types of operation, the electrical cables 100 and 107 are each connected to one or the other of the connector fittings 98 and 105 provided on the case 90 of the phasing hybrid 88, as shown in the drawing. Where the circular polarization is desired to be clockwise, the connections are reversed from those used where the circular polarization is desired to be counter-clockwise. This reversal may be made at the fittings 98 and 105 or elsewhere, such as by reversing the connections at the fittings 102 and 110 on the other side of the case 90.

Where horizontal or vertical polarization is desired, only one pair of the antenna dipoles is used and, thus, the phasing hybrid 88 is not required and may simply be disconnected from the antenna assembly 11.

If desired, the particular electrical cable 100 or 107 coupled to the antenna elements to be used, such as to the vertical dipoles 37, 38 in the case of vertical polarization or to the horizontal dipoles 40, 41 in the case of horizontal polarization, may simply be disconnected from the case 90 of the phasing hybrid 88 and connected directly to the related equipment. Thus, it is not necessary to completely disconnect the phasing hybrid 88 in order to obtain vertical or horizontal polarization, it being sufficient to by-pass the particular fittings 98, 110 or 102, 105 which are not needed to be used to obtain the desired polarization pattern.

If desired, the necessary connection changes involved in switching from one type of polarization to another, as aforesaid, may be made from a remote location using standard or conventional remote switching techniques.

Additional operations wherein the present invention may find wide application are those wherein diversity reception is involved. For example, two of the antenna arrays 11 may be employed, at separate locations separated a suitable distance from each other. One or both of the pairs of antenna dipoles of each assembly 11 may be employed to receive energy at each such location, whereupon the received energy signals may be supplied to related equipment through suitable transmission lines.

While the invention has been described herein with particular reference to certain applications and embodiments thereof, these are not to be considered as limitations, the scope of the invention being best defined in the appended claims.

What is claimed is:

1. In an antenna arrangement, the combination of a full-wavelength driven element portion having enlarged outer ends and a director element portion comprising a set of spaced coaxial retarding elements electrically isolated from each other.

2. The invention as claimed in claim 1 wherein said set of retarding elements includes a pair of elements extending in a common plane spaced-apart from said driven element portion.

3. In an antenna arrangement, the combination of a full-wavelength driven element portion having enlarged outer ends, a director element portion mounted in spaced-apart relation to said driven element portion and comprising a set of spaced coaxial retarding elements electrically isolated from each other, and a reflector mounted in spaced-apart relation to said driven element portion and disposed on the side thereof opposite said director element portion.

4. In an antenna arrangement, a full-wavelength driven element portion comprising a pair of half-wavelength dipoles having enlarged outer end portions and a conductive sleeve encircling and disposed in spaced-apart relation to each of the adjacent quarter-wavelength sections of said dipoles and a set of spaced coaxial retarding elements mounted in spaced relation to said dipoles.

5. The invention as claimed in claim 4 wherein said conductive sleeve is a full-wavelength element having an inner portion encircling said adjacent quarter-wavelength sections and having reentrant portions encircling said inner portions and with free ends disposed in spaced-apart relation thereto.

6. In an antenna arrangement, the combination of a first pair of half-wavelength dipoles and a second pair of half-wavelength dipoles mounted in a cruciform arrangement, at least one set of directors including in each set first and second pairs of retarding elements disposed in spaced-apart and generally aligned relation to said first and second pairs of dipoles, the retarding elements of each pair being electrically isolated from each other and also from the retarding elements of the other pairs.

7. The invention as claimed in claim 6 wherein each of said retarding elements extends a distance less than a half-wavelength and wherein one set of directors is spaced-apart from its corrsponding dipole a distance less than a quarter-wavelength.

8. The invention as claimed in claim 6 wherein said set of directors is mounted ahead of said dipoles and including a reflector mounted behind said dipoles.

9. The invention as claimed in claim 8 wherein said reflector is spaced-apart from said dipoles a distance equal to approximately a quarter-wavelength.

10. The invention as claimed in claim 8 wherein the overall length of each pair of said retarding elements is not greater than a full-wavelength and wherein the overall length of said reflector is greater than a full-wavelength.

References Cited by the Examiner

UNITED STATES PATENTS

| | | | |
|---|---|---|---|
| 2,199,050 | 4/1940 | Jenkins | 343—819 |
| 2,239,724 | 4/1941 | Lindenblad | 343—791 X |
| 2,270,130 | 1/1942 | Laport | 343—798 X |
| 2,374,271 | 4/1945 | Brown | 343—798 |
| 2,423,095 | 7/1947 | De Rosa | 333—31 |
| 2,455,403 | 12/1948 | Brown | 343—817 X |
| 2,471,284 | 5/1949 | Rea | 343—813 |
| 2,664,507 | 12/1953 | Mural | 343—795 |
| 2,704,811 | 3/1955 | Walters | 343—791 X |
| 2,841,792 | 7/1958 | Edson et al. | 343—819 |
| 2,897,459 | 7/1959 | Stark | 333—31 |
| 3,092,835 | 6/1963 | Jaytanie | 313—817 X |
| 3,093,826 | 6/1963 | Fink | 343—854 |
| 3,096,520 | 7/1963 | Ehrenspeck | 343—834 |

FOREIGN PATENTS 804,966   8/1936   France.

OTHER REFERENCES

Shimizu: IRE Wescon Convention Record, 1957, vol. I, part 1, p. 4–15.

HERMAN KARL SAALBACH, *Primary Examiner.*

E. LIEBERMAN, *Assistant Examiner.*